United States Patent
Reynolds et al.

(10) Patent No.: US 10,924,790 B1
(45) Date of Patent: Feb. 16, 2021

(54) VIDEO STREAM MODIFICATION

(71) Applicant: INTERNATIONAL BUSINESS MACHINES CORPORATION, Armonk, NY (US)

(72) Inventors: Spencer Thomas Reynolds, Austin, TX (US); Raden Tonev, Austin, TX (US); Zachary A. Silverstein, Austin, TX (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/783,482

(22) Filed: Feb. 6, 2020

(51) Int. Cl.
| | |
|---|---|
| H04N 21/258 | (2011.01) |
| H04N 21/442 | (2011.01) |
| H04N 21/2187 | (2011.01) |
| H04N 21/84 | (2011.01) |

(52) U.S. Cl.
CPC ... *H04N 21/25841* (2013.01); *H04N 21/2187* (2013.01); *H04N 21/44204* (2013.01); *H04N 21/84* (2013.01)

(58) Field of Classification Search
CPC ....... H04N 21/25841; H04N 21/44204; H04N 21/2187; H04N 21/84
See application file for complete search history.

(56) References Cited

U.S. PATENT DOCUMENTS

| | | | |
|---|---|---|---|
| 8,970,666 B2 | 3/2015 | Digiovanni | |
| 9,298,986 B2 | 3/2016 | Ferlatte | |
| 9,826,256 B2 | 11/2017 | Sham | |
| 9,866,765 B2 | 1/2018 | Brav | |
| 10,122,483 B2 | 11/2018 | Gonzales, Jr. | |
| 2009/0204484 A1 | 8/2009 | Johnson | |
| 2014/0344062 A1 | 11/2014 | Lamont | |
| 2015/0062339 A1 | 3/2015 | Ostrom | |
| 2015/0222952 A1* | 8/2015 | Tomita | H04N 21/4722 725/10 |

FOREIGN PATENT DOCUMENTS

CN 101537618 B 11/2010

* cited by examiner

*Primary Examiner* — Yassin Alata
(74) *Attorney, Agent, or Firm* — Schmeiser, Olsen & Watts; Stephanie Carusillo (57) ABSTRACT

A method, system, and program product for modifying a location based video steam is provided. The method includes receiving a video stream being presented to viewers. Video frames are extracted from the video stream. The video frames are analyzed, and a digital display device is detected presenting first video information. A specified identification attribute of the digital display device is located, and it is detected that the digital display device is currently within a field of view of the video stream. A detected viewer count, associated metadata, and topics of interest of the viewers are retrieved and it is determined that the detected viewer count exceeds a previous viewer count detected with respect to a previous presentation of the video stream. In response, second video information is retrieved and the first video information is disabled. The second video information is presented to the viewers.

20 Claims, 7 Drawing Sheets

VIDEO STREAM MODIFICATION

BACKGROUND

The present invention relates generally to a method for modifying a video stream and in particular to a method and associated system for improving software and video technology associated with monitoring a live video stream being presented to users, detecting a digital display device detected within the live video stream, and modifying visual information being presented via the digital display device.

SUMMARY

A first aspect of the invention provides a location based video steam modification method comprising: continuously receiving, by a processor of a hardware device, a video stream being presented to a plurality of viewers; extracting, by the processor, video frames from the video stream; analyzing, by the processor, the video frames; detecting, by the processor based on results of the analyzing, a digital display device presenting first video information; locating, by the processor based on results of the detecting the digital display device, a specified identification attribute of the digital display device; detecting, by the processor in response to the locating the specified identification attribute, that the digital display device is currently within a field of view of the video stream being presented to the plurality of viewers; retrieving, by the processor in response to results of the detecting that the digital display device is currently within the frame of view of the video stream, a detected viewer count, associated metadata, and topics of interest of the plurality of viewers; determining, by the processor, that the detected viewer count exceeds a previous viewer count detected with respect to a previous presentation of the video stream; retrieving, by the processor in response to results of the determining and based on the associated metadata and the topics of interest, second video information; disabling, by the processor, the first video information; and presenting, by processor to the plurality of viewers via the digital display device currently within the field of view of the video stream, the second video information.

A second aspect of the invention provides a computer program product, comprising a computer readable hardware storage device storing a computer readable program code, the computer readable program code comprising an algorithm that when executed by a processor of a hardware device implements a location based video steam modification method, the method comprising: continuously receiving, by the processor, a video stream being presented to a plurality of viewers; extracting, by the processor, video frames from the video stream; analyzing, by the processor, the video frames; detecting, by the processor based on results of the analyzing, a digital display device presenting first video information; locating, by the processor based on results of the detecting the digital display device, a specified identification attribute of the digital display device; detecting, by the processor in response to the locating the specified identification attribute, that the digital display device is currently within a field of view of the video stream being presented to the plurality of viewers; retrieving, by the processor in response to results of the detecting that the digital display device is currently within the frame of view of the video stream, a detected viewer count, associated metadata, and topics of interest of the plurality of viewers; determining, by the processor, that the detected viewer count exceeds a previous viewer count detected with respect to a previous presentation of the video stream; retrieving, by the processor in response to results of the determining and based on the associated metadata and the topics of interest, second video information; disabling, by the processor, the first video information; and presenting, by processor to the plurality of viewers via the digital display device currently within the field of view of the video stream, the second video information.

A third aspect of the invention provides a hardware device comprising a processor coupled to a computer-readable memory unit, the memory unit comprising instructions that when executed by the processor implements a location based video steam modification method comprising: continuously receiving, by the processor, a video stream being presented to a plurality of viewers; extracting, by the processor, video frames from the video stream; analyzing, by the processor, the video frames; detecting, by the processor based on results of the analyzing, a digital display device presenting first video information; locating, by the processor based on results of the detecting the digital display device, a specified identification attribute of the digital display device; detecting, by the processor in response to the locating the specified identification attribute, that the digital display device is currently within a field of view of the video stream being presented to the plurality of viewers; retrieving, by the processor in response to results of the detecting that the digital display device is currently within the frame of view of the video stream, a detected viewer count, associated metadata, and topics of interest of the plurality of viewers; determining, by the processor, that the detected viewer count exceeds a previous viewer count detected with respect to a previous presentation of the video stream; retrieving, by the processor in response to results of the determining and based on the associated metadata and the topics of interest, second video information; disabling, by the processor, the first video information; and presenting, by processor to the plurality of viewers via the digital display device currently within the field of view of the video stream, the second video information.

The present invention advantageously provides a simple method and associated system capable of accurately modifying a video stream.

DETAILED DESCRIPTION

Figure 1:
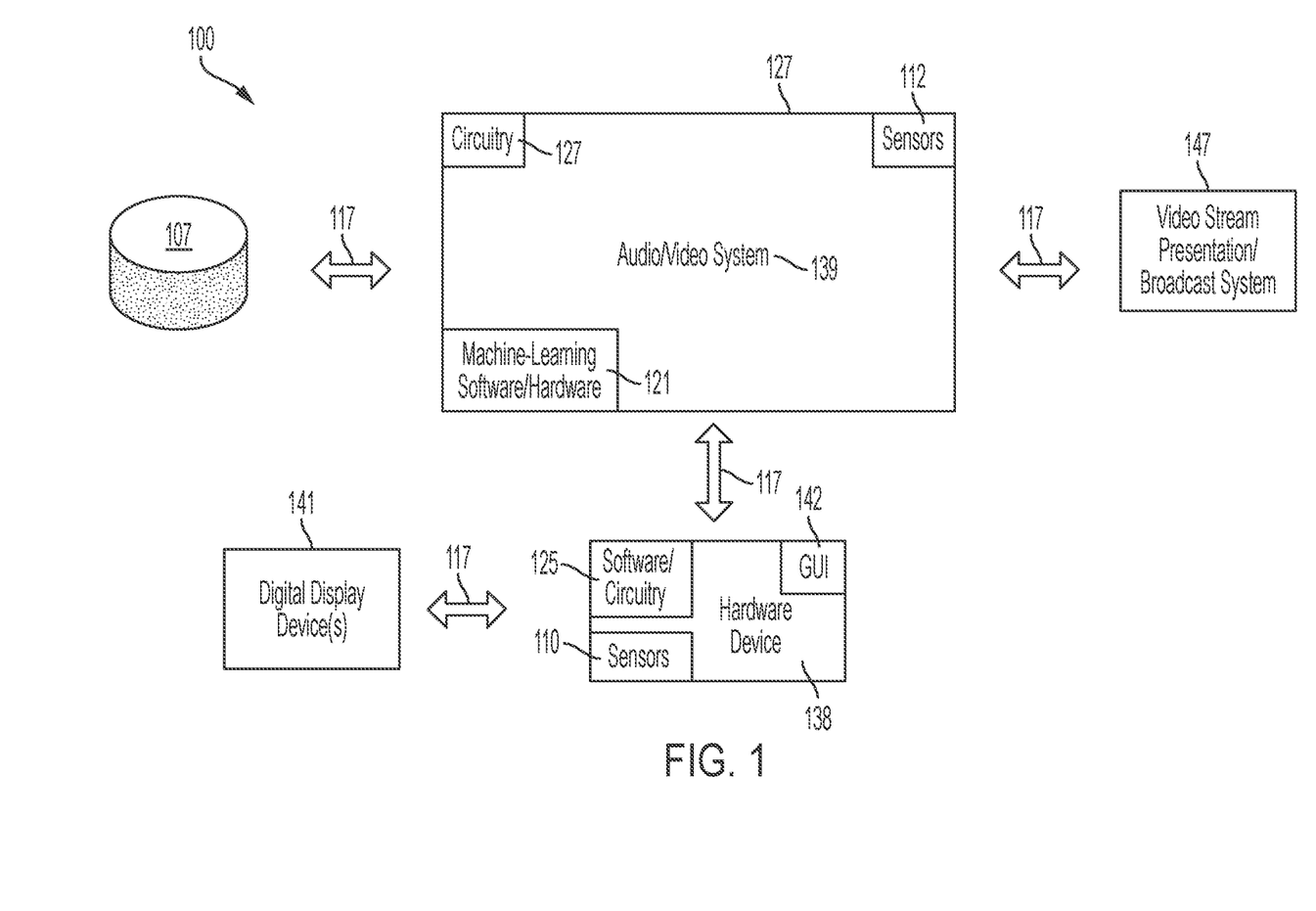
FIG. 1 illustrates a system for improving software and video technology associated with monitoring a live video stream being presented to users, detecting a digital display device detected within the live video stream, and modifying visual information being presented via the digital display device, in accordance with embodiments of the present invention.

FIG. 1 illustrates a system 100 for improving software and video technology associated with monitoring a live video stream being presented to users, detecting a digital display device detected within the live video stream, and modifying visual information being presented via the digital display device, in accordance with embodiments of the present invention. System 100 addresses issues associated with a typical content delivery system. For example, current media entities may seek updated and efficient means for presenting visual content to a viewing audience. Current display screens located at viewing arenas (e.g., a sports stadiums) may be enabled to display content (e.g., advertisements) for live and remote audiences. The content being displayed via the current display screens does not typically display customizable content based on a viewing size of an audience. Therefore, system 100 is enabled to display customizable content for an audience based on a detected number of viewer determined to be located within a field of view of the live video stream.

System 100 enables the following implementation scenario associated with monitoring a live video stream being presented to users and modifying visual information being presented via the digital display device within the live video stream. The scenario is initiated when a television camera (broadcasting a live video stream) pans across a soccer field (of a stadium) during a live soccer event. During the live soccer event, digital screens within the stadium present video content including advertisements (e.g., sold at a specified rate and cyclically displayed throughout the live soccer event). The digital screens periodically come in and out of a field of view of the live video stream. Therefore, system 100 is configured to detect a viewing audience (in accordance with obtaining user authorization) of the live video stream, determine when the digital screens are located within the field of view of the live video stream, and modify the video content (including advertisements) accordingly.

System 100 of FIG. 1 includes an audio/video system 139 (i.e., specialized hardware device), video stream presentation/broadcast system 147, a hardware device 138, a digital display device(s), and a database 107 (e.g., a cloud-based system) interconnected through a network 117. Audio/video system 139 includes specialized circuitry 127 (that may include specialized software), sensors 112, and machine-learning software code/hardware structure 121 (i.e., including machine-learning software code). Hardware device 138 may include, inter alia, a computing device, etc. Hardware device 138 includes specialized circuitry 125 (that may include specialized software), sensors 110, and a GUI 142. Sensors 110 and 112 may include any type of internal or external sensor (or biometric sensor) including, inter alia, ultrasonic three-dimensional sensor modules, an optical sensor, a video retrieval device, an audio retrieval device, humidity sensors, voltage sensors, a keyboard, a mouse, a touch screen, etc. Video stream presentation/broadcast system 147 comprises a system for broadcasting a live video feed (e.g., of a sporting event) to an audience (e.g., a television or online audience). Digital display device(s) comprises any type of display device (e.g., a jumbotron at a stadium) configured to present visual content (e.g., advertisements) at a specified location during a live event. Audio/video system 139 and hardware device 138 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, audio/video system 139 and hardware device 138 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for monitoring a live video stream being presented to users, detecting a digital display device detected within the live video stream, and modifying visual information being presented via the digital display device. Network 117 may include any type of network including, inter alia, a 5G telecom network, a local area network, (LAN), a wide area network (WAN), the Internet, a wireless network, etc. Alternatively, network 117 may include an application programming interface (API).

System 100 enables the following process for enabling a live video stream provider to integrate passthrough viewing integration with system 100 as follows:

The process is initialized when a celebrity user (i.e., associated with millions of followers) is walking down a specified street in a specified city and begins livestreaming to users. During the live stream, the celebrity user steps in front of a digital screen (located on the specified street) currently deployed for displaying local advertisements. The digital screen is connected (via an owner of the digital screen) system 100 and includes a unique identifier that may be recognized when the digital screen is located within a field of view of live stream. The connection to system 100 enables an owner of the digital screen to sell local adds and additionally allows the owner to produce additional revenue when the digital screen is located within a view of the livestream. Subsequently, system 100 scans the livestream and identifies the digital screen (at the specified street) located within the field of view of the live stream. During the scan, metadata from the s livestream viewers (e.g., quantity, demographics, etc.) analyzed with respect to user authorization. Additionally, a database of content associated with advertisers is assessed for an optimal match (e.g., a highest bidder, an appropriate match for size and demographics, etc.). In response, an optimal portion of content is delivered to and displayed via the digital screen within the field of view of livestream and the owner of the digital screen is paid for the use of the digital screen by a content provider. After the content has been delivered, the digital screen may return to its original content catered to the local context of the specified street in the specified city.

System 100 enables a process for determining when a digital screen (presenting advertising content) is present within the field of view of a livestream camera thereby allowing for viewing by additional viewers. A view count (of the additional viewers) may be fed back into an underlying content engine and based on the detected view count and display metrics, the advertising content may be dynamically modified to optimize the advertising content for a larger audience.

System 100 may additionally analyze a sentiment of content being streamed to determine if a particular ad or piece of content should be displayed. For example, an entity selling soft drinks may prefer that their dynamic content appears on the screens within a field of view of a livestream video when a positive event occurs (e.g., during a touchdown in a football game). Likewise, the entity selling soft drinks may prefer that their dynamic content does not appears on the screens within a field of view of a livestream video when a negative event occurs (e.g., an injury during a football game).

Metadata or source stream information may be analyzed for determining usual viewers (of the stream) and modifying displayed content based on determined livestream viewer interest. Likewise, system 100 is configured to initiate processing if a user enters a given macro-location for content advertisements (e.g., only running a processing module when a user is located within geolocation associated stadium. System 100 may additionally be enabled if streaming content is determined to be visible for a threshold (time period) T and non-significant user movement has been detected thereby implying that the viewing is not just a short-term view. A language of content or a localization of content may be modified and a specialized engine may crosscheck expected content with respect to actual content detected within a user's livestream to detect a clarity and/or fidelity of an advertisement to ensure that an advertisement is visible and detected by livestream viewers.

A group level content filtering process may be executed if a group/set of advertising firms combine profile data and filter content at group level. A prioritization of group based data may be performed according to filtering of aggregated priority within the livestream. System 100 is configured to derive a relevance with respect to an audience based on various data sources such as, inter alia:
1. A profile(s) of an entity advertising (e.g., demographics for a content creator's data).
2. Firm based social media data (e.g., social posts)
3. Venue driven IoT (based on venue IoT dynamic sensors and feeds).

System 100 enables the following process for automatically determining a livestream viewer count (of a video stream) and associated metrics for modifying physically present advertisements (mapped to a specific location) being passed through the video stream. The process is initiated when a feed for the video stream is processed (e.g., based on a given macro-location for content) by pulling a frame (of the video stream) every X seconds and processing each pulled frame to locate a unique identifier present for each display device (displaying content) detected with an associated frame. If a unique identifier is located and a detected display device is associated with a list of stored display devices, the detected display device is determined to be visible by livestream video viewers. Likewise, livestream viewer counts, associated metadata (associated with the video viewers), and topics of interest are retrieved and processed for determining an increased growth of viewership. Subsequently, differing content (differing from the original content displayed) is retrieved for displaying on the detected display device currently located within a field of view of the livestream. The differing content may be determined by:
1. Analyzing a sentiment of content being streamed to determine whether a particular advertisement or content should be displayed.
2. Analyzing metadata or a source stream to determine typical viewers and modify displayed content or advertisements based on determined livestream viewer interest.

System may additionally crosscheck expected content with respect to actual content visible within a user's livestream to detect a clarity and fidelity of an advertisement to ensure that an advertisement is visible to livestream viewers.

Figure 2:
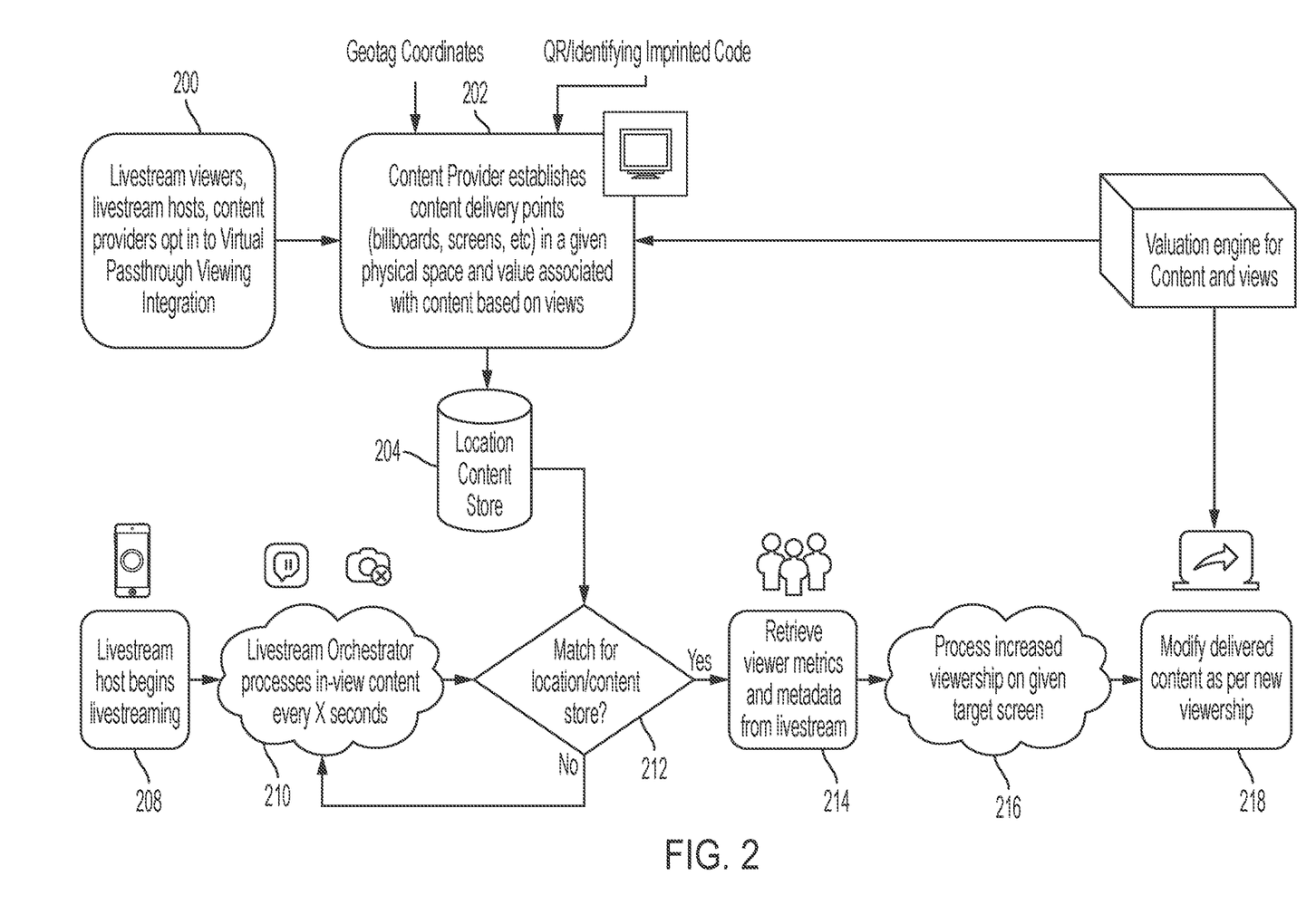
FIG. 2 illustrates an algorithm detailing an implementation example enabled by the system of FIG. 1 for presenting video information via a secondary display device detected within a live video stream, in accordance with embodiments of the present invention.

FIG. 2 illustrates an algorithm detailing an implementation example enabled by system 100 of FIG. 1 for presenting video information via a secondary display device detected within a live video stream, in accordance with embodiments of the present invention. In step 200, livestream viewers, livestream creators, and content providers opt into the presentation system (via a device) via terms and conditions software execution, etc. In step 202, the content providers broadcast advertisements on digital screens and map each advertisement to a specific location. The mapping process may include utilizing a geolocation of a specific screen with respect to a physical mapping process via a media display engine. The broadcast advertisements are analyzed with respect to a valuation engine for content and views. In step 204, location and device/content information is stored within a datastore. The location and device/content information may include: GPS Coordinates for a specific location, relative coordinates for a relative location, A QR code associated with the device, a unique identifier (UID) for the device, a device content stream for displayed content, content metadata, etc. In step 208, a user initiates a process for livestreaming video content and viewers join the video stream. In step 210, a livestream engine processes a livestream feed (livestreaming the video content) and every X seconds, a video frame is pulled and processed to detect a unique identifier present for each display device within a video frame. In step 212, it is determined if a unique identifier is located. If in step 212, it is determined that a unique identifier is not located, then step 210 is repeated. If in step 212, it is determined that a unique identifier is located, then the display device is determined to be visible by livestream viewers. In step 214, an artificial intelligence (AI) engine retrieves livestream viewer counts and associated metadata and topics of interest of the livestream viewers. In step 216, the AI engine processes a significant increased growth of viewership and the content provider/displayer retrieves a different portion of content to display on unique display devices located within a view of the livestream. In step 218, the AI engine replaces originally displayed content with current derived content for presentation.

Figure 3:
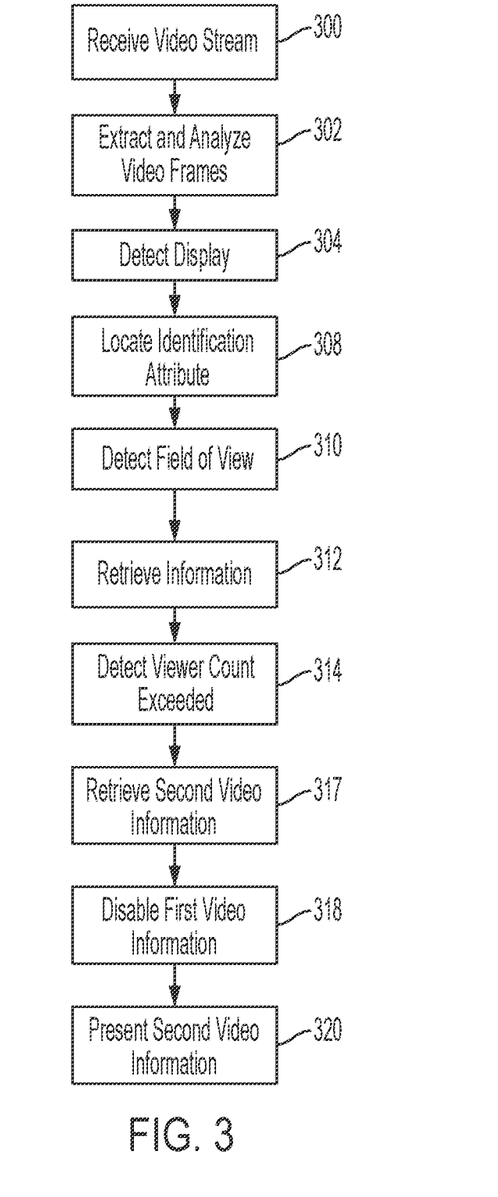
FIG. 3 illustrates an algorithm detailing a process flow enabled by the system of FIG. 1 for improving software and video technology associated with monitoring a live video stream being presented to users, detecting a digital display device detected within the live video stream, and modifying visual information being presented via the digital display device, in accordance with embodiments of the present invention.

FIG. 3 illustrates an algorithm detailing a process flow enabled by system 100 of FIG. 1 for improving software and video technology associated with monitoring a live video stream being presented to users, detecting a digital display device detected within the live video stream, and modifying visual information being presented via the digital display device, in accordance with embodiments of the present invention. Each of the steps in the algorithm of FIG. 3 may be enabled and executed in any order by a computer processor(s) executing computer code. Additionally, each of the steps in the algorithm of FIG. 3 may be enabled and executed in combination by audio/video system 139 and/or hardware device 138. In step 200, a video stream being presented to a plurality of viewers is continuously received by a hardware device. In step 302, video frames are extracted from the video stream. The video frames are analyzed for viewable objects. In step 304, a digital display device (presenting first video information) is detected within at least one video frame. In step 308, a specified identification attribute of the digital display device is located based on results of step 304. In step 310, it is determined that the digital display device is currently located within a field of view of the video stream being presented to the plurality of viewers. In step 312, a detected viewer count, associated metadata, and topics of interest of the plurality of viewers are retrieved in response to results of step 310. In step 314, it is determined that the detected viewer count exceeds a previous viewer count detected with respect to a previous presentation of the video stream. In step 317, second video information (e.g., associated with a specified value factor) is retrieved based on the associated metadata and topics of interest. The second video information may be retrieved based on a sentiment of content of the video stream. Retrieving the second video information may be initialized based on; retrieving a macro location associated with the second video information or a specified event type associated with the plurality of viewers. Alternatively, it may be determined if content of video stream has been visible to the plurality of viewers for a specified threshold time period and non-significant user movement of the plurality of viewers may be detected. Likewise, retrieving the second video information may be initialized based on video stream visibility exceeding the specified threshold time period the detected non-significant user movement. Additionally, expected content of the video stream may be crosschecked with respect to actual content of the video stream and a resulting visual clarity and fidelity of the video stream may be detected such that retrieving the second video information is initialized based on results of detecting the visual clarity and fidelity of the video stream.

In step 318, the first video information is disabled from presentation. In step 320, the second video information is presented to the plurality of viewers via the digital display device currently located within the field of view of the video stream. The second video information may be translated from a first language to a second language and the second video information may be presented to the plurality of users in the second language.

Figure 4:
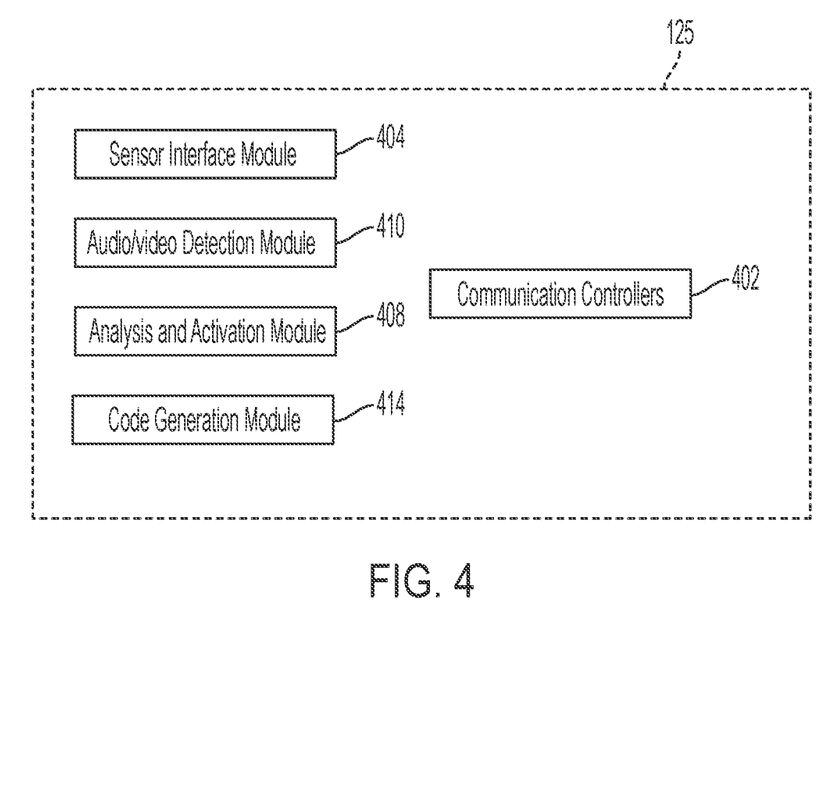
FIG. 4 illustrates an internal structural view of the software/circuitry structure of FIG. 1, in accordance with embodiments of the present invention.

FIG. 4 illustrates an internal structural view of software/circuitry 125), in accordance with embodiments of the present invention. Software/circuitry 125 includes a sensor interface module 404, an audio/video detection module 410, an analysis and activation module 408, a code generation module 414, and communication controllers 402. Sensor interface module 404 comprises specialized hardware and software for controlling all functions related to sensors 110 or 112 of FIG. 1. Audio/video detection module 410 comprises specialized hardware and software for controlling all functionality related to control of all audio/video stream, digital display, and viewer detection processes for implementing the process described with respect to the algorithm of FIGS. 2 and 3. Analysis and activation module 408 comprises specialized hardware and software for controlling all functions related to the analysis, enabling, and disabling steps of FIG. 3. Code generation module 414 comprises specialized hardware and software for controlling all functions related to generating machine learning feedback for generating machine learning software code for executing future video stream modification processes. Communication controllers 402 are enabled for controlling all communications between sensor interface module 404, audio/video detection module 410, analysis and activation module 408, and a code generation module 414.

Figure 5:
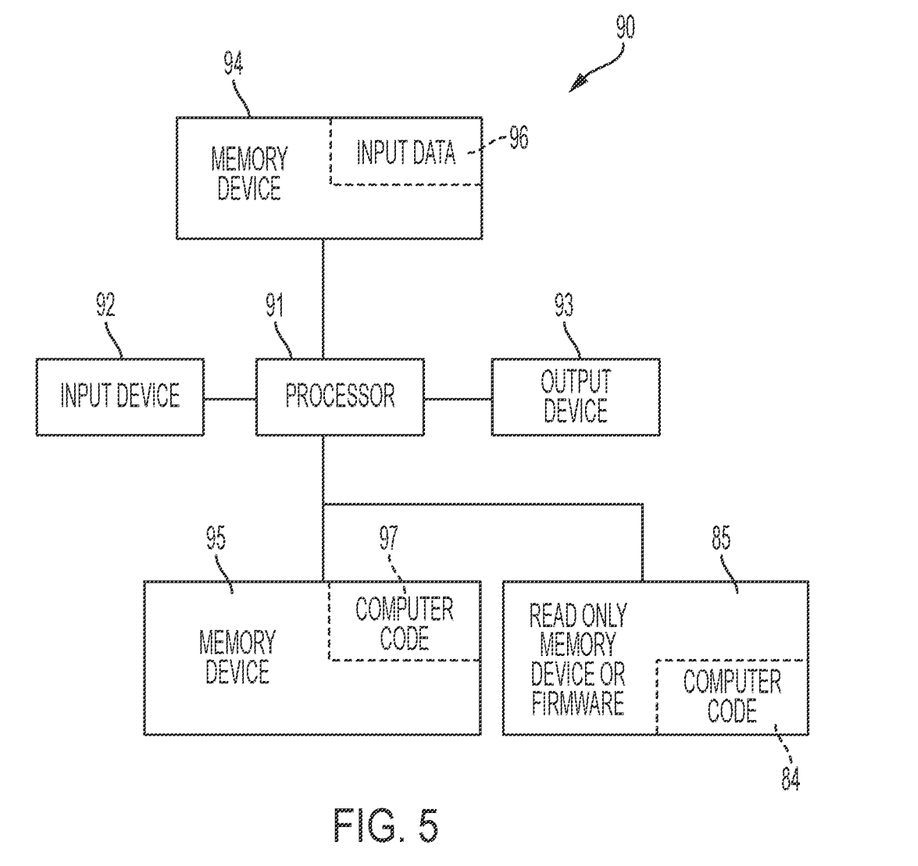
FIG. 5 illustrates a computer system used by the system of FIG. 1 for improving software and video technology associated with monitoring a live video stream being presented to users, detecting a digital display device detected within the live video stream, and modifying visual information being presented via the digital display device, in accordance with embodiments of the present invention.

FIG. 5 illustrates a computer system 90 (e.g., audio/video system 139 and/or hardware device 138 of FIG. 1) used by or comprised by the system of FIG. 1 for improving software and video technology associated with monitoring a live video stream being presented to users, detecting a digital display device detected within the live video stream, and modifying visual information being presented via the digital display device, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithms of FIGS. 2 and 3) for improving software and video technology associated with monitoring a live video stream being presented to users, detecting a digital display device detected within the live video stream, and modifying visual information being presented via the digital display device. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithms of FIGS. 2 and 3) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software and video technology associated with monitoring a live video stream being presented to users, detecting a digital display device detected within the live video stream, and modifying visual information being presented via the digital display device. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software and video technology associated with monitoring a live video stream being presented to users, detecting a digital display device detected within the live video stream, and modifying visual information being presented via the digital display device. In another embodiment, the invention provides a business method that performs the process steps of the invention on a subscription, advertising, and/or fee basis. That is, a service supplier, such as a Solution Integrator, could offer to enable a process for improving software and video technology associated with monitoring a live video stream being presented to users, detecting a digital display device detected within the live video stream, and modifying visual information being presented via the digital display device. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a configuration of hardware and software, any configuration of hardware and software, as would be known to a person of ordinary skill in the art, may be utilized for the purposes stated supra in conjunction with the computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
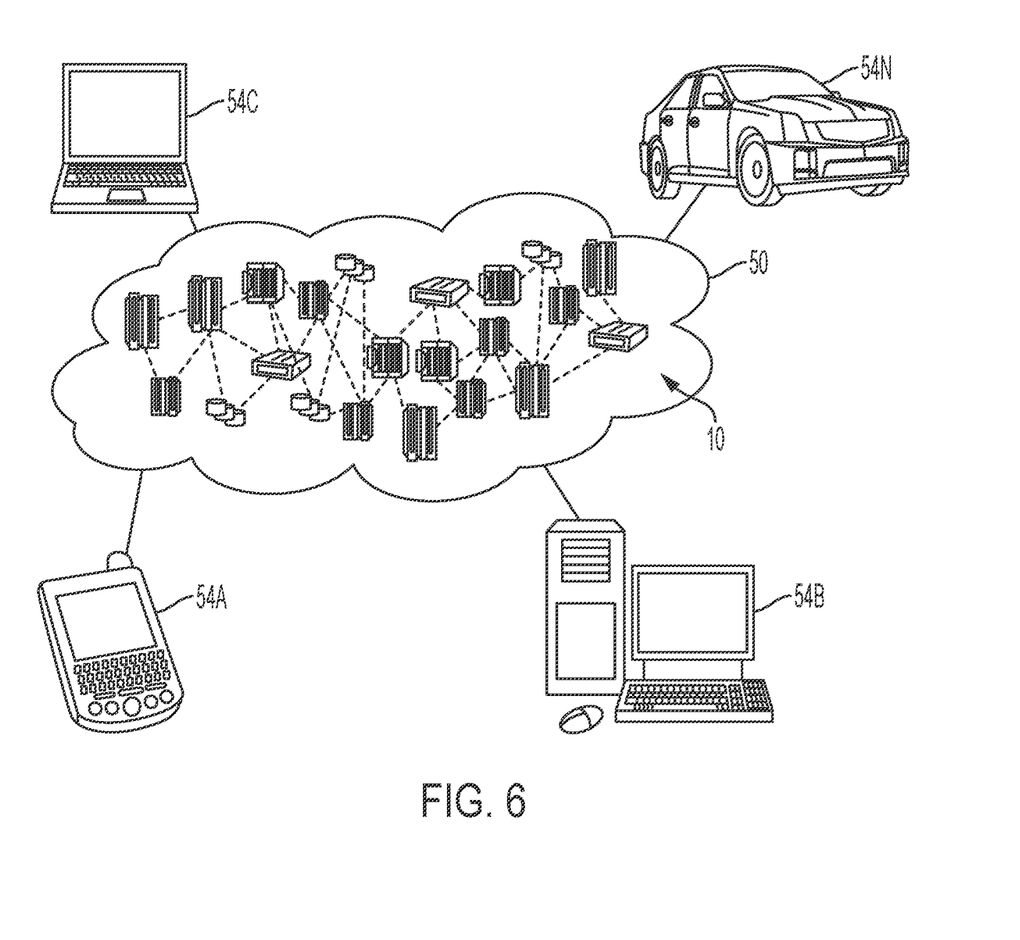
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
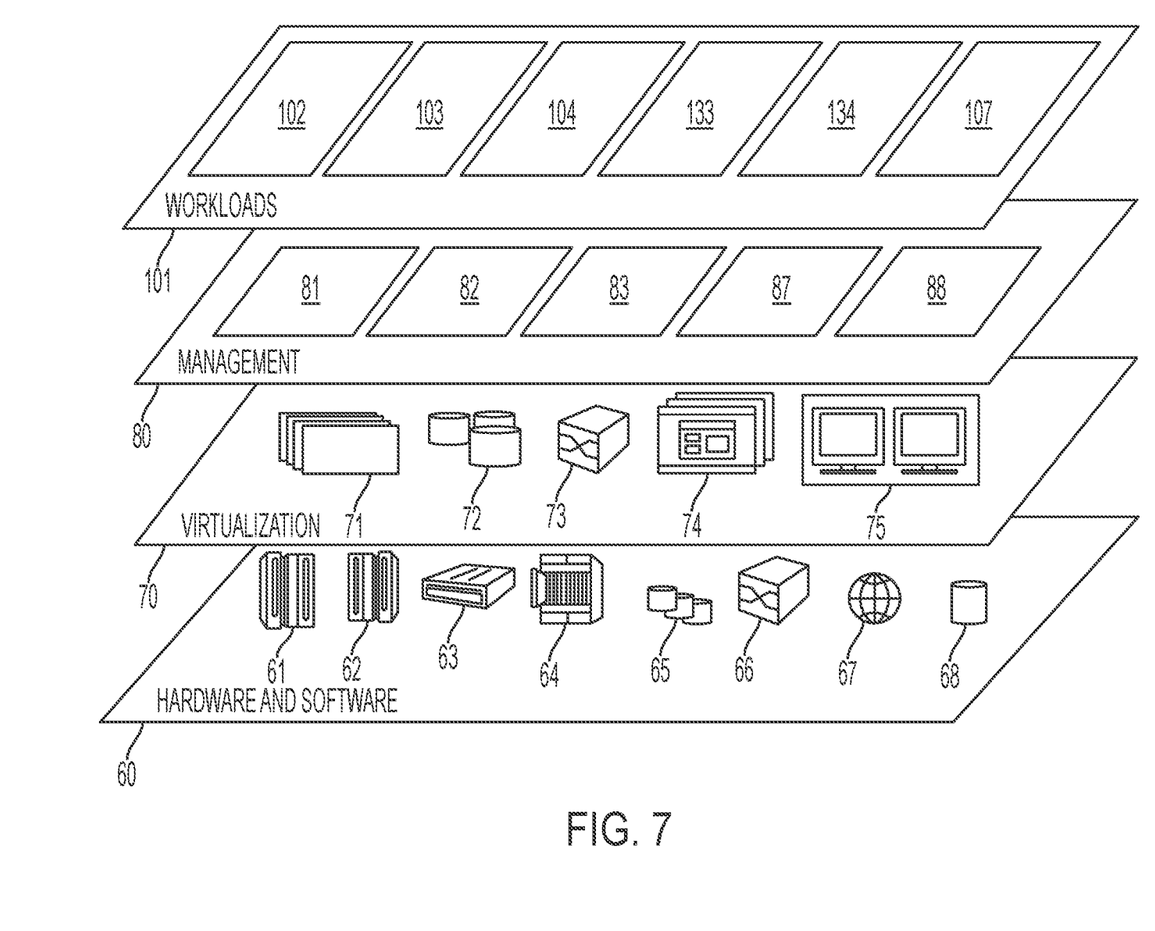
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and improving software and video technology associated with monitoring a live video stream being presented to users, detecting a digital display device detected within the live video stream, and modifying visual information being presented via the digital display device 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A location based video steam modification method comprising:
   continuously receiving, by a processor of a hardware device, a video stream being presented to a plurality of viewers;
   extracting, by said processor, video frames from said video stream;
   analyzing, by said processor, said video frames;
   detecting, by said processor based on results of said analyzing, a digital display device presenting first video information;
   locating, by said processor based on results of said detecting said digital display device, a specified identification attribute of said digital display device;
   detecting, by said processor in response to said locating said specified identification attribute, that said digital display device is currently within a field of view of said video stream being presented to said plurality of viewers;
   retrieving, by said processor in response to results of said detecting that said digital display device is currently within said frame of view of said video stream, a detected viewer count, associated metadata, and topics of interest of said plurality of viewers;
   determining, by said processor, that said detected viewer count exceeds a previous viewer count detected with respect to a previous presentation of said video stream;
   retrieving, by said processor in response to results of said determining and based on said associated metadata and said topics of interest, second video information;
   disabling, by said processor, said first video information; and
   presenting, by processor to said plurality of viewers via said digital display device currently within said field of view of said video stream, said second video information.

2. The method of claim 1, further comprising:
   determining, by said processor, a sentiment of content of said video stream, wherein said retrieving said second video information is further based on said sentiment of content.

3. The method of 1, further comprising:
   retrieving, by said processor, a macro location associated with said second video information, wherein said retrieving said second video information is initialized based on said retrieving said macro location.

4. The method of 1, further comprising:
    determining, by said processor, if content of said video stream has been visible to said plurality of viewers for a specified threshold time period; and
    detecting, by said processor, non-significant user movement of said plurality of viewers, wherein said retrieving said second video information is initialized based on results of: said determining that said content has been visible and said detecting said non-significant user movement.

5. The method of 1, further comprising:
    crosschecking, by said processor, expected content of said video stream with respect to actual content of said video stream; and
    detecting, by said processor based on results of said crosschecking, a visual clarity and fidelity of said video stream, wherein said retrieving said second video information is initialized based on results of said detecting said visual clarity and said fidelity of said video stream.

6. The method of claim 1, wherein said retrieving said second video information is initialized based on a specified event type associated with said plurality of viewers.

7. The method of claim 1, further comprising:
    translating, by said processor, said second video information from a first language to a second language, wherein said second video information is presented to said plurality of users in said second language.

8. The method of claim 1, wherein said second video information is associated with a specified value factor.

9. The method of claim 1, further comprising:
    providing at least one support service for at least one of creating, integrating, hosting, maintaining, and deploying computer-readable code in the hardware device, said code being executed by the processor to implement: said continuously receiving, said extracting, said analyzing, said detecting said digital display device, said locating, said detecting that said digital display device is currently within said field of view, said retrieving said detected viewer count, said determining, said retrieving said second video information, said disabling, and said presenting.

10. A computer program product, comprising a computer readable hardware storage device storing a computer readable program code, said computer readable program code comprising an algorithm that when executed by a processor of a hardware device implements a location based video steam modification method, said method comprising:
    continuously receiving, by said processor, a video stream being presented to a plurality of viewers;
    extracting, by said processor, video frames from said video stream;
    analyzing, by said processor, said video frames;
    detecting, by said processor based on results of said analyzing, a digital display device presenting first video information;
    locating, by said processor based on results of said detecting said digital display device, a specified identification attribute of said digital display device;
    detecting, by said processor in response to said locating said specified identification attribute, that said digital display device is currently within a field of view of said video stream being presented to said plurality of viewers;
    retrieving, by said processor in response to results of said detecting that said digital display device is currently within said frame of view of said video stream, a detected viewer count, associated metadata, and topics of interest of said plurality of viewers;
    determining, by said processor, that said detected viewer count exceeds a previous viewer count detected with respect to a previous presentation of said video stream;
    retrieving, by said processor in response to results of said determining and based on said associated metadata and said topics of interest, second video information;
    disabling, by said processor, said first video information; and
    presenting, by processor to said plurality of viewers via said digital display device currently within said field of view of said video stream, said second video information.

11. The computer program product of claim 10, wherein said method further comprises:
    determining, by said processor, a sentiment of content of said video stream, wherein said retrieving said second video information is further based on said sentiment of content.

12. The computer program product of claim 10, wherein said method further comprises:
    retrieving, by said processor, a macro location associated with said second video information, wherein said retrieving said second video information is initialized based on said retrieving said macro location.

13. The computer program product of claim 10, wherein said method further comprises:
    determining, by said processor, if content of said video stream has been visible to said plurality of viewers for a specified threshold time period; and
    detecting, by said processor, non-significant user movement of said plurality of viewers, wherein said retrieving said second video information is initialized based on results of: said determining that said content has been visible and said detecting said non-significant user movement.

14. The computer program product of claim 10, wherein said method further comprises:
    crosschecking, by said processor, expected content of said video stream with respect to actual content of said video stream; and
    detecting, by said processor based on results of said crosschecking, a visual clarity and fidelity of said video stream, wherein said retrieving said second video information is initialized based on results of said detecting said visual clarity and said fidelity of said video stream.

15. The computer program product of claim 10, wherein said retrieving said second video information is initialized based on a specified event type associated with said plurality of viewers.

16. The computer program product of claim 10, wherein said method further comprises:
    translating, by said processor, said second video information from a first language to a second language, wherein said second video information is presented to said plurality of users in said second language.

17. The computer program product of claim 10, wherein said second video information is associated with a specified value factor.

18. A hardware device comprising a processor coupled to a computer-readable memory unit, said memory unit comprising instructions that when executed by the processor implements a location based video steam modification method comprising:
    continuously receiving, by said processor, a video stream being presented to a plurality of viewers;

extracting, by said processor, video frames from said video stream;

analyzing, by said processor, said video frames;

detecting, by said processor based on results of said analyzing, a digital display device presenting first video information;

locating, by said processor based on results of said detecting said digital display device, a specified identification attribute of said digital display device;

detecting, by said processor in response to said locating said specified identification attribute, that said digital display device is currently within a field of view of said video stream being presented to said plurality of viewers;

retrieving, by said processor in response to results of said detecting that said digital display device is currently within said frame of view of said video stream, a detected viewer count, associated metadata, and topics of interest of said plurality of viewers;

determining, by said processor, that said detected viewer count exceeds a previous viewer count detected with respect to a previous presentation of said video stream;

retrieving, by said processor in response to results of said determining and based on said associated metadata and said topics of interest, second video information;

disabling, by said processor, said first video information; and presenting, by processor to said plurality of viewers via said digital display device currently within said field of view of said video stream, said second video information.

19. The hardware device of claim 17, wherein said method further comprises:

determining, by said processor, a sentiment of content of said video stream, wherein said retrieving said second video information is further based on said sentiment of content.

20. The hardware device of claim 17, wherein said method further comprises:

retrieving, by said processor, a macro location associated with said second video information, wherein said retrieving said second video information is initialized based on said retrieving said macro location.

* * * * *